United States Patent [19]

Sudler

[11] Patent Number: 5,059,934
[45] Date of Patent: Oct. 22, 1991

[54] CROSS-COIL ROTARY MAGNET DEVICE

[75] Inventor: Roland Sudler, Frankfurt am Main, Fed. Rep. of Germany

[73] Assignee: VDO Adolf Schindling AG, Frankfurt am Main, Fed. Rep. of Germany

[21] Appl. No.: 389,970

[22] Filed: Aug. 4, 1989

[30] Foreign Application Priority Data

Aug. 22, 1988 [DE] Fed. Rep. of Germany ....... 3838464

[51] Int. Cl.$^5$ .............................................. H01F 7/14
[52] U.S. Cl. .................................. 335/272; 335/274; 335/301
[58] Field of Search ............... 335/253, 270, 272, 274, 335/279, 301

[56] References Cited

U.S. PATENT DOCUMENTS 3,501,725  3/1970  Olesen .................................. 335/272
4,691,135  9/1987  Sogabe et al. ................... 335/272 X Primary Examiner—George Harris
Attorney, Agent, or Firm—Martin A. Farber

[57] ABSTRACT

In a cross-coil rotary magnet device, a rotor (32) which is mounted rotatably together with a shaft (35) is formed of a permanent magnet (33) with diametrically opposite permanent magnet poles and a coil arrangement (10, 11) with coils which are arranged at an angular distance apart of, in particular, 90°. For receiving the coils there is provided a coil body (14) which is divided into two parts (15, 16) and in which bearings (36, 37) of the shaft (35) of the rotor (32) are shaped in such a manner that the shaft protrudes out of the coil body at least one front outer end (12). One of the two parts (15, 16) of the coil body (14) has on this outer end tab-shaped clips (24–27) for the clamping attachment of an intermediate body (2). Bores (38–43) for connecting pins (4–7) are provided in the coil body parallel to the shaft (35). The cross-coil rotary magnet device can thus be adapted to numerous applications.

14 Claims, 7 Drawing Sheets

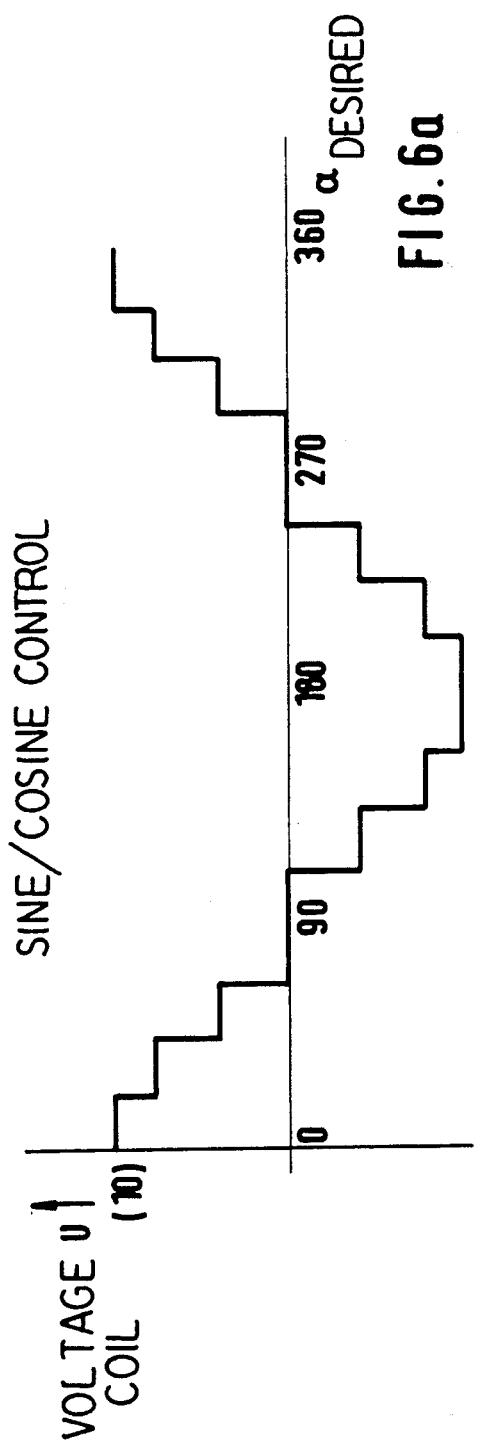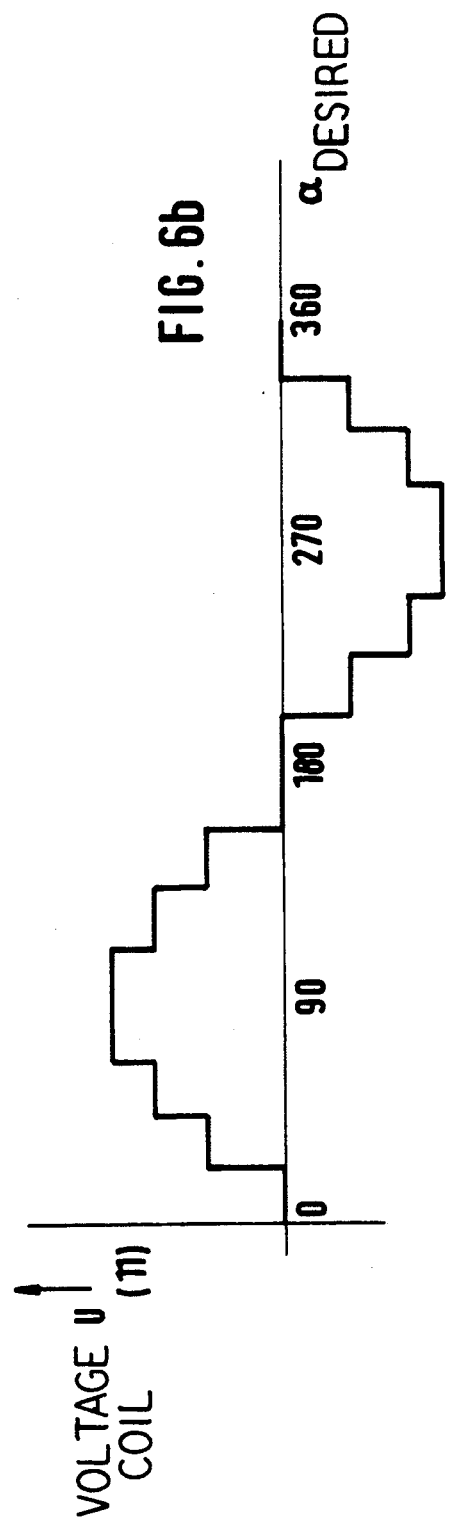

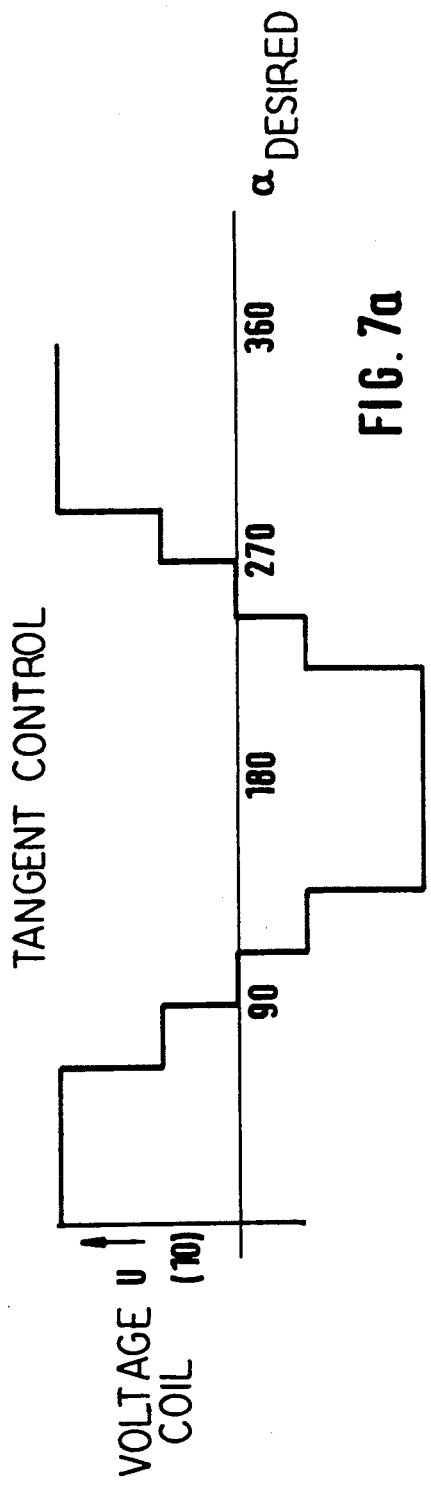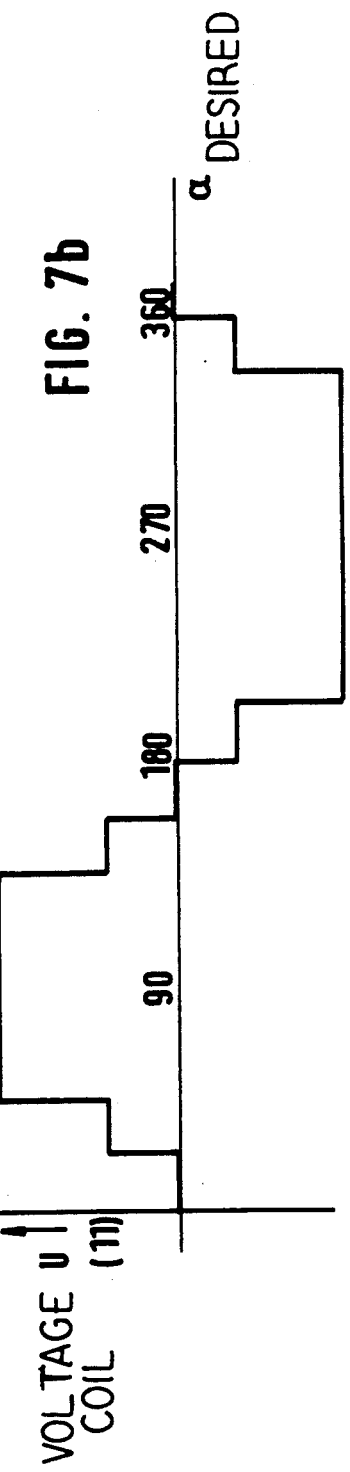

CROSS-COIL ROTARY MAGNET DEVICE

FIELD AND BACKGROUND OF THE INVENTION

The invention relates to a cross-coil rotary magnet device having a rotor which is mounted for rotation together with a shaft, the rotor consisting, in particular, of a permanent magnet with diametrically opposite permanent magnet poles, and having a coil arrangement with coils which are arranged at an angle of, in particular, 90° from each other.

Such a known cross-coil rotary magnet device is developed especially as a motor for driving a clockwork (Federal Republic of Germany OS No. 34 19 100). In that motor a rotatably mounted rotor has diametrically opposite permanent magnet poles. A multi-phase coil arrangement serves to produce a magnetic field which deflects the rotor as a function of control signals which are applied to coils of the coil arrangement. The coil arrangement has, for this purpose, a plurality of coils which are arranged at an equal angular distance apart, the coils surrounding the rotor and being controlled by sinusoidal voltages which are shifted apart in phase. The coil arrangement consists, in particular, of two coils which are arranged at right angles to each other and are fed with two sinusoidal voltages spaced 90° apart.

The axis of rotation or shaft can serve as the seconds shaft or minutes shaft of a clockwork. In the latter case, a minute hand is fastened on one end of the rotary shaft, which minute hand can be moved over a dial. An hour wheel is driven by a drive pinion disposed on the rotary shaft and a minute wheel, the hour wheel having an hour collar or tube surrounding the rotary shaft. An hour hand which can be moved over the dial is fastened on the hour tube.

In this motor, as in the case of other known cross-coil rotary magnet devices, a special development for a specific purpose of use, in this case for the driving of a clockwork, and which permits other use of the cross-coil rotary magnet arrangement only with extensive limitations or structural changes, is disadvantageous. Since the motor must be continuously fed with sinusoidal voltages, a correspondingly high expenditure of energy must be expected.

This motor, which is developed for driving a clockwork and has a drive pinion, minute wheel and hour wheel as well as an hour tube is, for instance, not suitable generally as device for indicating a mechanical measurement variable, in particular the speed of a motor vehicle.

In the known device for indicating a mechanical variable, in particular the speed of a motor vehicle, a measuring mechanism is provided which serves to displace a pointer and which, via a converter, is connected to a transmitter which produces a pulse at a pulse frequency which is proportional to a measurement variable (Federal Republic of Germany No. OS 27 30 699). A stepping motor which travels forward and backward serves as measuring mechanism. The stepping motor is fed with a direction-evaluated train of pulses which result from counting values formed during successive defined time intervals as a function of the measurement variable and which, when compared with each other, give a sign-evaluated difference. The stepping motor, which adjusts itself in accordance with said difference, is coupled to a dial mechanism via a gearing. Such a stepping motor, if constructed, would not be readily suitable for other applications, for instance as setting member, ratio meter or sensor.

SUMMARY OF THE INVENTION

It is an object of the present invention further to develop a cross-coil rotary magnet device of the type indicated above in such a manner that it is, in part, independent of a specific application while, on the other hand, it can be adapted in the simplest possible manner, to a specific application, i.e. it can be modified or supplemented.

According to the invention, a coil body (14) which is divided into two parts (15, 16) is provided for receiving coils. Bearings (36, 37) of the shaft (35) of a rotor (32) are so developed in the coil body that the shaft protrudes at least one front end (12) out of the coil body (14). Tab-shaped clips (24–27) for the clamping attachment of an intermediate body (2) are provided on this front end of one of the two parts (15, 16), and bored holes (38 to 43) for connecting pins (4 to 7) are provided in the coil body (14) parallel to the shaft (35).

In this way there is created in a structurally simple manner a basic system which can be modified in the manner of building blocks, in accordance with its use. Those parts of the cross-coil rotary magnet device which are common to all modifications of the device are so developed that they can be combined with each other and with the other special parts of the modifications without further change. The mounting of all modifications of the cross-coil rotary magnet arrangement can thus be effected in an economical manner as to time and cost. In particular the divided coil body with the tab-shaped clips protruding at its one part on the forward outer end contributes to this, it being possible, in each case, to clamp an intermediate body of different internal development for special functions on the clips.

These intermediate bodies, however, do not form part of the basic system, which consists of the rotor with shaft, the bipartite coil body with winding, and the connecting pins which can be passed through paraxial bore holes in the coil body. This basic system permits the use of the cross-coil rotary magnet device for all intended applications, namely as stepping-motor indicator, for instance for the speed of a vehicle or the speed of rotation of an engine, as two-phase stepping motor, for instance for mileage recording, as setting member, for instance for the displacement of a component of a motor vehicle, as ratio meter, for instance for a tank temperature indication, as quartz clock, in particular with rapid forward and backward setting, and as sensor, for instance to indicate speed and direction.

For the simple manufacture of the parts of the cross-coil rotary magnet arrangement and for the assembling thereof, the coil body (14) is furthermore advantageously divided essentially in a cross-sectional plane (e.g. A—A), i.e. perpendicular to the shaft, and located between the two parts of the coil body.

In order to obtain the aforementioned advantages, one of the bearings of the shaft is furthermore advisedly formed from each of the two parts of the coil body. The rotor is arranged between the two bearings in the cylindrical inside of the coil body. Two windings are so arranged on the coil body as stator, 90° apart from each other, that the conductors are located parallel to the shaft in each case between two webs arranged alongside each other on the circumference.

The suitable shaping of the coil body is in detail such that one of the bearings (36, 37) of the shaft (35) is formed from each of the two parts (15, 16) of the coil body (14).

Depending on the specific application, the intermediate body can serve merely as spacer or it may contain a gearing. In the latter case the intermediate body (2) surrounds a gearing into which the shaft (35) which protrudes out of the front end (12) of the coil body (1) engages by means of a pinion (13)), or a resetting element. There is, furthermore, a stop as well as a damping device, (e.g. wherein the intermediate body (2) encloses a reset element, a stop, and a damping device which is connected to the rotary shaft (35) protruding out of the front end (12) of the coil body (14)). The tab-shaped clips on the coil body result in any case in a precise centering as well as proper positioning and attachment of the intermediate body. An intermediate piece can serve for the attachment of a dial. Since the intermediate body together with the coil body always has the same height, cross-coil rotary magnet devices can in each case be attached to the rear of a printed circuit board and, at a uniform distance from said circuit board, extend forward where the scales, which are fastened to the intermediate pieces, lie at the same level.

A gearing in the intermediate body is used in those applications of the cross-coil rotary magnet device in which the latter is used for the stepping-motor indicator, as two-phase stepping motor or as setting member. In particular, when the intermediate piece with a gearing is to be used for mileage recording by means of a cipher-roll mechanism which has the same diameter as the cross-coil rotary magnet arrangement, the power takeoff from the gearing advisedly takes place eccentrically, an eccentrically arranged driven shaft (35) protruding out of the intermediate body (2) on the side thereof facing away from the coil body (14). The driven shaft can, in this case, readily engage into a drive disk of the odometer with internal toothing.

In a gearing which comprises several gear wheels (50 to 53) and pinions (54 to 57) which are in engagement with each other without play and one gear wheel (53) of which is connected on the driven shaft (3) to a pre-tensioned spring (59), the desired play-free gearing for a stepping-motor indicator is achieved by means of the pre-tensioned spring which acts on a gear wheel on the driven shaft. The spring is pre-tensioned most strongly upon a deflection of 0° and least strongly with a full deflection of about 45°. It is important in this connection that the spring moment be substantially smaller than the moment given off by the cross-coil rotary magnet device.

The connecting pins which are passed through the paraxial bore holes and on which the cross-coil rotary magnet device can be fastened protrude at one front end out of the coil body and possibly out of a gearing in the intermediate piece placed thereon. The connecting pins (4–7) extend at least to such an extent out of the front end of the coil body (14) that the coil body with the intermediate body (2) placed thereon can be connected. The connecting pins (4–7) pass through the intermediate body (2).

In particularly preferred manner, the connecting pins (4–7) also protrude out of a rear end of the coil body (14) and thus out of both ends of the latter. In this way, a separate printed circuit board can be arranged both on the rear outer side of the coil body and underneath a front dial. LED elements without sockets can be soldered onto the front circuit board.

The stator of the cross-coil rotary magnet arrangement is advantageously developed in a manner wherein the coil body (14) is shaped cylindrically on the inside with four webs (17–20) which extend cylindrically on the outside and are arranged at equal distances apart along the circumference, and a screening ring (48) with which the intermediate body (2) is aligned can be pushed concentrically onto the coil body (14). In this way without salient poles as a result of the magnetic return, a detent action and/or detent moment is exerted on the rotor, thus determining defined positions of the rotor. Due to the detent moment with non-excited winding, the control can be effected with short pulses which involve a low average consumption of current. It is therefore not necessary that the cross-coil rotary magnet arrangement be fed for special applications with sinusoidal voltages as in the case of a quartz clock. Furthermore, the selection of the material of which the screening ring consists permits further adapting of the cross-coil rotary magnet device to the specific application.

For use as stepping-motor indicator, as two-phase stepping motor, as setting member or as sensor, a damping of the rotor movement is achieved by a screening ring of unannealed low-grade iron which has a residual coercive field strength of about 5 Oe. A screening ring for use of the cross-coil rotary magnet arrangement as quartz clock, however, has a high residual coercive field strength of 50–100 Oe. The detent positions which have been defined in non-excited state by the holding moment can, depending on the control, be those of a half-minute or minute jumper. Due to the high residual coercive field strength, overshooting of the rotor is substantially prevented, so that a reduction in the distrurbing development of noise is simultaneously obtained.

According to a feature of the invention, the concentric screening ring (48) abuts axially on the coil body (14) against a raised inner side of the clips (24, 27).

According to another feature of the invention, the screening (48) consists of iron of a residual coercive field strength of about 5 Oe in order to dampen the cross-coil rotary magnet measurement mechanism.

BRIEF DESCRIPTION OF THE DRAWINGS

With the above and other objects and advantages in view, the present invention will become more clearly understood in connection with the detailed description of preferred embodiments, when considered with the accompanying drawing of which:

FIG. 2 is a longitudinal section essentially through the basic system of the cross-coil rotary magnet arrangement, but with the screening ring and pinion placed on;

FIG. 3 is a section corresponding to FIG. 2, but a variant of the cross-coil rotary device with an intermediate piece containing a gearing placed on;

FIGS. 6a, 6b show the variation with time of voltages with which coils of the cross-coil rotary magnet arrangement are fed in a first variant (sine/cosine control); and FIGS. 7a, 7b are corresponding graphs showing the change with time of the voltages in a second variant (tangent control).

DETAILED DESCRIPTION OF THE PREFERRED EMBODIMENTS

Figure 1:
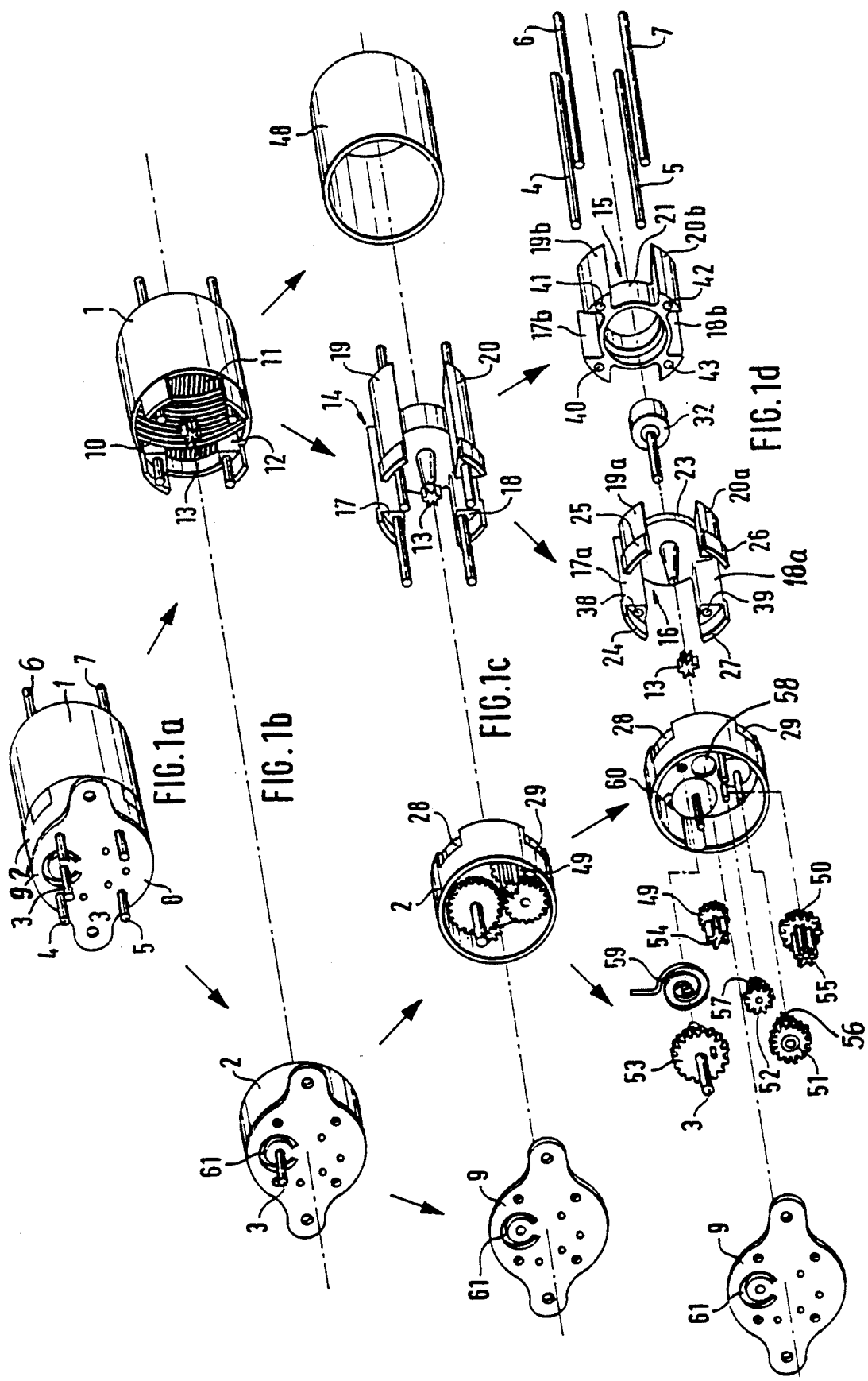
FIGS. 1a–1d are a perspective view of an embodiment of the cross-coil rotary magnet device with a gearing arranged in an intermediate body, namely in exploded views with increasing disassembly of the arrangement in FIGS. 1b–1d.

FIG. 1a shows in assembled condition a cross-coil rotary magnet arrangement which is to serve as two-phase stepping motor for indicator systems. It consists essentially of a cross-coil rotary magnet mechanism 1 and, placed thereon, an intermediate body 2 containing a gearing. The longitudinal dimensions of the cross-coil rotary magnet mechanism and of the intermediate body account for the entire height h of the cross-coil rotary magnet device which is controlling for installation. FIG. 1a furthermore shows a driven shaft 3 which extends eccentrically in forward direction out of the intermediate body 2. Connecting pins which pass through the cross-coil rotary magnet arrangement and extend out of this arrangement from both sides at the outer ends thereof are designated 4-7. The front end of the cross-coil rotary magnet arrangement is designated 8; it is formed by a plate 9 which closes the intermediate body off in front. The outer ends of the cross-coil rotary magnet mechanism itself are covered in FIG. 1a.

In FIG. 1b, the intermediate body which contains the gearing has been removed from the cross-coil rotary magnet mechanism, so that two coils 10 and 11 arranged at an angular distance of 90° with respect to each other can be noted in the cross-coil rotary magnet mechanism, the coils forming together a cross-coil or a two-phase winding of a stepping motor. A pinion 13 which is fastened on a shaft protrudes out of a front end 12 of the cross-coil rotary magnet mechanism, the pinion, as described below, being able to be introduced into the gearing in the intermediate body in such a manner that it comes into engagement with a gear wheel in the gearing.

Further details of the construction, in particular of the cross-coil rotary magnet measuring mechanism, can be noted from FIGS. 1c and 1d.

Figure 2:
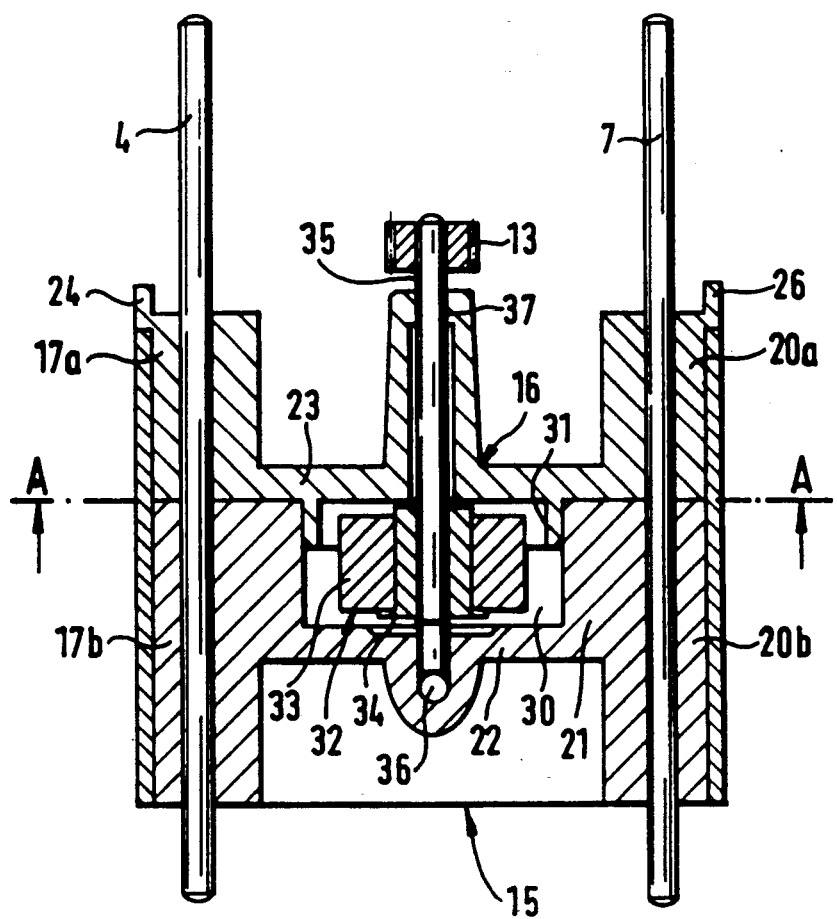

According thereto, a coil body generally designated 14 and divided essentially in a cross-sectional plane A—A—see FIG. 2—consists of two coil-body parts 15 and 16. The coil body 15 is shaped cylindrically on the inside and has four webs 17-20 which are curved cylindrically on their outside. According to FIG. 1d each of the webs is formed of a front web section 17a, 18a, 19a, 20a and a rear web section 17b, 18b, 19b, 20b, which sections have the same cross-sectional shapes. The webs are shaped in such a manner that they form chambers between them to receive the two coils 10 and 11. The rear web sections 17b, 18b, 19b, 20b converge to form a cylindrical ring 21 which is closed on the inside by an intermediate wall 22—see FIG. 2. The front web sections, 17a, 18a, 19a, 20a, on the other hand, are formed on a front wall 23. Tab-shaped clips 24, 25, 26, 27 protrude from the front web sections 17a, 18a, 19a, 20a, the clips being provided for the form-locked and forced-locked engagement into corresponding recesses in the intermediate body 2 in order to hold the latter clamped.

The recesses 28 and 29 can be noted in FIG. 1c. The recesses are groove-shaped and also serve as centering means since they are arranged at equal distances apart over the circumference of the intermediate body.

The cylindrical ring 21 of the coil-body part 15 also encloses a cylindrical inner space 30 which is closed off toward the front or, in FIG. 2, on top by the front wall 23 of the coil-body part 16, which wall is provided with a cylindrical extension 31. A rotor, generally designated as 32, is mounted in the cylindrical inner space 30. The rotor consists essentially of a permanent magnet 33 which is magnetized, forming diametrically opposite poles. The rotor is fastened on a shaft 35 via a hub 34. The shaft is mounted for rotation in bearings 36 and 37, in the two coil-body parts 15 and 16, respectively. A pinion 13 is attached fixed on a front end of the shaft which protrudes out of the coil-body part 16.

It can furthermore be noted from FIGS. 1c, 1d and 2 that connecting pins 4-7 can be passed through bore holes, for instance 38, 39, in the coil-body part 16 as well bore holes 42, 43 in the coil-body part 15 which are aligned with each other in pairs; the connecting pins can serve for the attachment of the cross-coil rotary magnet device, for instance on printed circuit boards.

It can furthermore be noted from FIGS. 1c and 2 that a cylindrical screening ring 48 of ferromagnetic material can be pushed onto the outside of the webs and the magnetic properties of the material can be selected in detail as a function of the intended use of the cross-coil rotary magnet device. In particular for use of the cross-coil rotary magnet device as stepping-motor indicator, two-phase stepping motor, setting member or sensor, the screening ring can consist of non-annealed low-grade iron having a residual coercive field strength of about 5 Oe and produce a damping of the rotor movement. If a high detent moment is to be obtained with the winding not excited (currentless coils), a ferromagnetic material having a high residual coercive field strength of, for instance, 50-100 Oe will, however, be used.

FIGS. 1c and 1d furthermore show details of the gearing which is provided in the intermediate body and which, upon use of the arrangement as stepping-motor indicator, two-phase stepping motor or setting member, can be placed or clipped on the cross-coil rotary magnet mechanism. The gearing is formed essentially by the gear wheels 49-53 and the pinions 54-57 connected to the gear wheels 49, 50, 51, 52, the gear wheels and pinions meshing in pairs. The pinion 13 on the shaft 35 can be inserted into the intermediate body through an opening 58 in such a manner that it comes into engagement with the first gear wheel 49. The gear wheel 53 on the driven side of the gearing is connected to the eccentrically arranged driven shaft 3.

Particularly for a stepping-motor indicator, the gearing is adjusted so as to be free of play by a spiral spring 59 which, on the one hand, acts on the last gear wheel 53 and, on the other hand, is suspended into a slot 60 in the housing of the intermediate body. The spring is most strongly pre-tensioned with a deflection of 0° of a pointer which is not shown and which is connected to the driven shaft, and the pointer is least pre-tensioned upon a full deflection of, for instance, 270°. The spring moment is thus adjusted relatively low.

Figure 3:
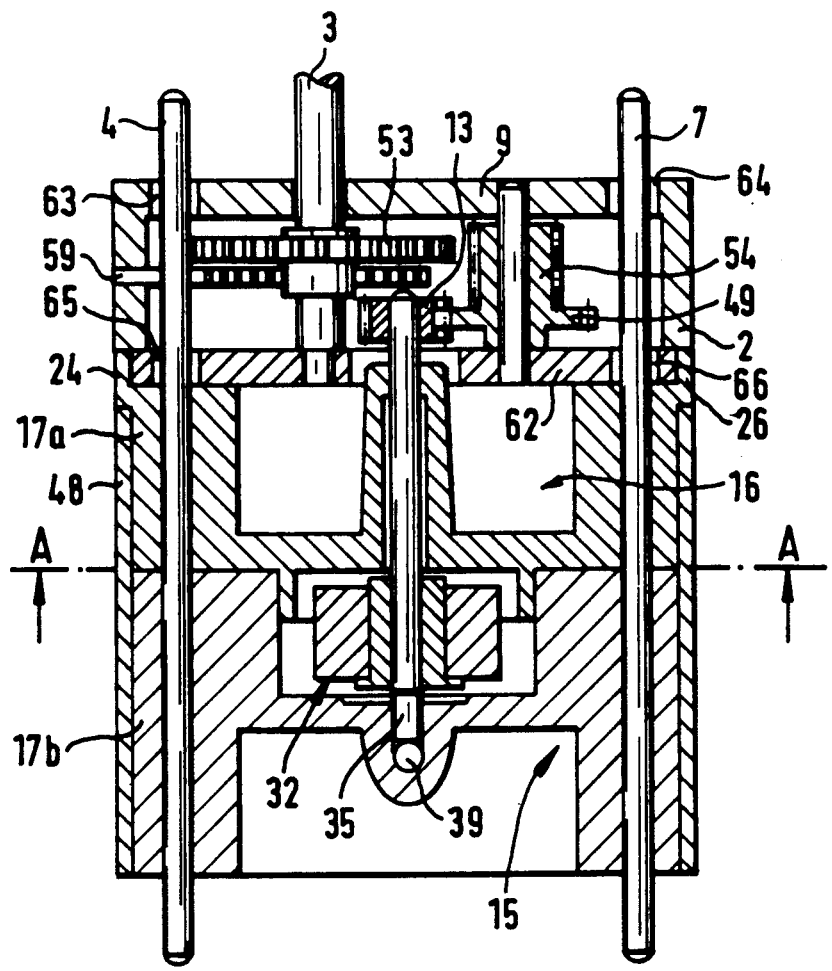

For certain applications, for instance as ratio meter, the plate 9 can furthermore form a stop in the manner that a stop element attached to the shaft 35 comes against one end of a circular segment-shaped opening 61 in the plate 9. A stop element can, for instance, consist of a pin (not shown in FIG. 1) which extends from the gear wheel 53 through the circular segment-shaped opening 61. When using the cross-coil rotary magnet mechanism as ratio meter, the intermediate body can furthermore contain a return spring—possibly instead of the spring 59 which effects the compensating of play—as well as a damping device. From the showing of the cross-coil rotary magnet arrangement in FIG. 3, which corresponds essentially to that of the basic system as shown in FIG. 2, there can furthermore be noted some details of the inside of the intermediate body 2 which contains a gearing. It can be noted, in particular, from said FIG. 3 how the gear wheels and pinions are mounted in the front plate 9 and in a wall 62 corresponding to it on the rear side. Furthermore, according to FIG. 3, the connecting pins—connecting pins 4 and 7 can be noted—extend through relatively large bore holes 63-66 in the plate 9 and wall 62, so that the position of the connecting pins is determined exclusively by the bore holes in the coil-body parts 15 and 16.—The bearing 36 is developed both in FIG. 2 and in FIG. 3 in such a manner that it can also take up axial forces, i.e. the cross-coil rotary magnet mechanism can be operated in the vertical position shown.

Figure 4:
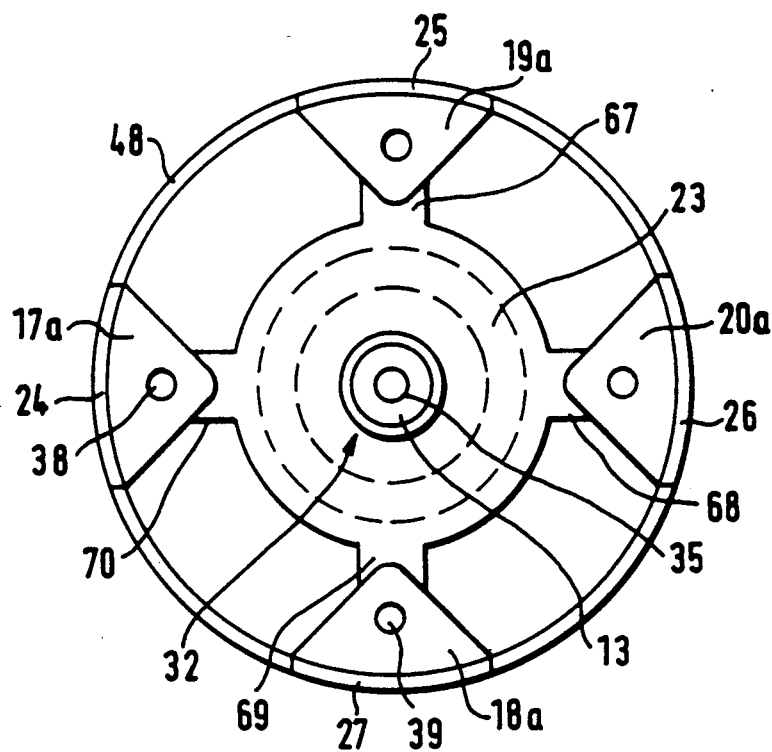
FIG. 4 is a view of the shaft-side of the cross-coil rotary magnet arrangement of FIG. 2.

FIG. 4 is a view of the front side of the cross-coil rotary magnet mechanism without attachment of the intermediate body: There can be noted from it the webs or web sections 17a, 18a, 19a, 20a which are arranged at equal distances apart over the circumference of the substantially cylindrical coil body, the webs or web sections having protruding clips 24-27. Against the rearward ends of these clips the screening ring 48 which has been placed on the coil body abuts. The web sections pass into the front wall 23 at the places 67-70. The central shaft 35 to which the pinion 13 is fastened can also be noted. The rotor 32, which is covered by the front wall 23, is merely indicated by a dashed line.

Figure 5:
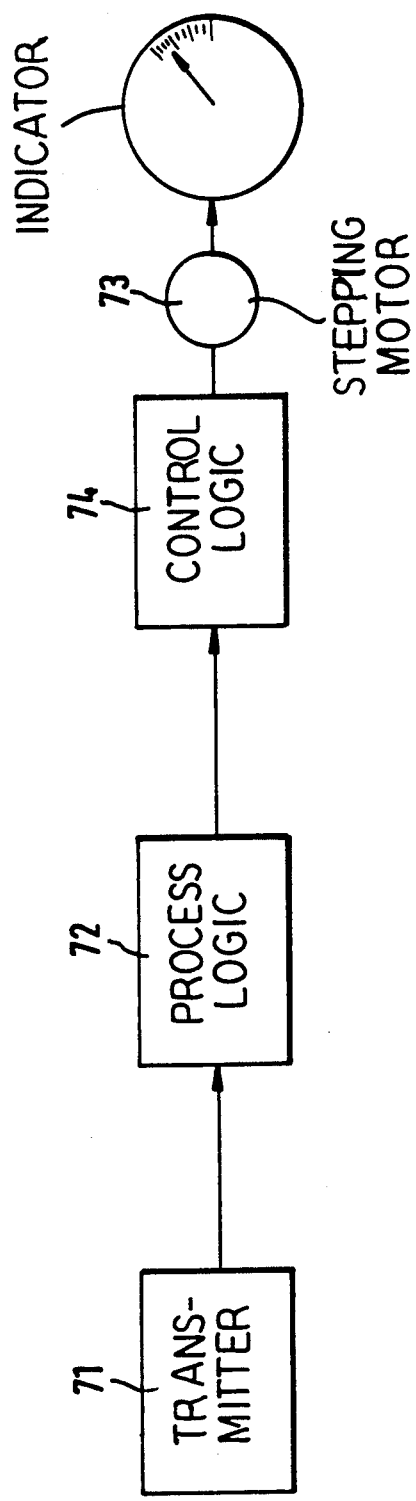
FIG. 5 is a simplified block diagram of a stepping-motor indicator device constructed with the cross-coil rotary magnet arrangement.

The electric control of the cross-coil rotary magnet arrangement—in the event that it is not used as sensor—can take place substantially in conventional manner and adapted to the application at hand. Reference is had to FIG. 5 for the use as stepping-motor indicator. A transmitter, designated 71 in this figure, produces a pulse with a pulse frequency which is proportional to a mechanical variable, for instance the speed of a vehicle or the speed of rotation of an engine. In a processing logic 72 arranged behind the transmitter, a reference point is formed, which is referred to a zero point, for the displacement of the stepping motor 73. The processing logic can comprise, in particular, counters and a control for producing counting values from the pulse produced by the transmitter during successive defined time intervals as well as a comparator for the formation of a sign-valued difference from the counting values produced in two successive time intervals. The processing logic 72 can transfer such a difference into a control logic 74 for the stepping motor, in which voltages are produced which feed the coils 10 and 11 (see FIG. 1b) of the stator. The voltages having a curved shape which causes a rotation of the rotor according to the sign-valued difference.

According to FIGS. 6a and 6b, voltages U for the coils 10 and 11 are produced in the control logic, which voltages represent for coil 10 an approximately step-shaped cosine function and for coil 11 an approximately sinusoidal curve shape as a function of the angle of rotation $\alpha_{DESIRED}$ which is desired for the setting. For one rotation of the rotor of 360° these curve shapes of the voltages pass through a full cycle of amplitude sequence predetermined as a function of time. The amplitude sequences can also be viewed as approximately sinusoidal or cosinusoidal voltage curves which are shifted in phase with respect to each other. The stepwise approximation of the sine shape and cosine shape can be readily realized with digital components, for instance via a controlled duty cycle in case of a fixed clock rate. When the indication takes place by the stepping motor via a gearing which can be contained in the intermediate body, then a rough step shape of the approximation is permissible.

In the variant according to FIGS. 7a and 7b, approximately tangent-shaped curves are formed as voltages for the coils 10 and 11 in the control logic 74, for the generation of which an even smaller expenditure is sufficient than in the case of the above-mentioned sinusoidal and cosinusoidal curves.

Legend of FIG. 5

(a) Transmitter
(b) Processing logic
(c) Control logic
(d) Indication

Legends of FIGS. 6a and 6b (a) Coil
(b) Sine/cosine control
(c) Desired

Legends of FIGS. 7a and 7b (a) Coil
(b) Tangent control
(c) Desired

I claim:

1. A cross-coil rotary magnet device comprising
 a shaft, and a rotor which is mounted on the shaft for rotation together with the shaft, the rotor including a permanent magnet with diametrically opposite permanent magnet poles, there being a coil arrangement on the rotor with coils which are arranged at an angle of preferably 90° from each other;
 a coil body which is divided into two parts and which is configured for receiving the coils;
 bearings for the shaft of the rotor, the bearings being disposed in said coil body and holding the shaft such that the shaft protrudes from at least a front end of the coil body;
 an intermediate body, and tab-shaped clips for a clamping attachment of the intermediate body to the coil body, the clips being provided on said front end, said front end being on one of the two parts of the coil body; and
 a plurality of connecting pins, and bored holes in the coil body for receiving the connecting pins, the bored holes being parallel to the shaft.

2. A cross-coil rotary magnet device according to claim 1, wherein
 the coil body is divided essentially in a cross-sectional plane to provide said two parts of the coil body.

3. A cross-coil rotary magnet device according to claim 2, wherein
 said bearings of the shaft are formed respectively each in one of the two parts of the coil body.

4. A cross-coil rotary magnet device according to claim 1, further comprising
 a gearing and a pinion on the shaft; and wherein the intermediate body surrounds the gearing; and the shaft protrudes out of the front end of the coil body to engage with the pinion.

5. A cross-coil rotary magnet device according to claim 4, wherein the driven shaft is arranged ascentrically relative to the intermediate body, and protrudes out of the intermediate body on the side thereof facing away from the coil body.

6. A cross-coil rotary magnet device according to claim 4, further comprising a pretensioned spring; and wherein the gearing comprises several gear wheels and pinions which are in engagement with each other without play and one further gear wheel which is disposed on the driven shaft and connected to the pre-tensioned spring.

7. A cross-coil rotary magnet device according to claim 5, further comprising a pretensioned spring; and wherein the gearing comprises several gear wheels and pinions which are in engagement with each other without play and one further gear wheel which is disposed on the driven shaft and connected to the pre-tensioned spring.

8. A cross-coil rotary magnet device according to claim 1, further comprising, a reset element, a stop and a damping device which are operatively connected to the rotary shaft protruding out of the front end of the coil body; and wherein the intermediate body encloses the reset element and the stop and the damping device.

9. A cross-coil rotary magnet device according to claim 1, wherein the connecting pins extend sufficiently out of the front end of the coil body for connection of the coil body with the intermediate body placed thereon, the connecting pins passing through the intermediate body.

10. A cross-coil rotary magnet device according to claim 9, wherein the connecting pins also project out of a rear end of the coil body.

11. A cross-coil rotary magnet device according to claim 1, wherein the coil body is shaped cylindrically on the inside, and comprises four webs which extend cylindrically on the outside of the coil body and are arranged at equal distances apart along the circumference of the coil body, there being a screening ring which is pushed concentrically onto the coil body for aligning the intermediate body with the coil body.

12. A cross-coil rotary magnet device according to claim 11, further comprising a plurality of clips extending from the coil body for engagement with the intermediate body, the screening ring being concentric with the intermediate body; and wherein the screening ring abuts axially on the coil body against a raised inner side of the clips.

13. A cross-coil rotary magnet device according to claim 12, wherein the screening ring comprises iron of a residual coercive field strength of about 5 Oe in order to dampen movement of the shaft of the cross-coil rotary magnet device.

14. A cross-coil rotary magnet device according to claim 11, wherein the screening ring comprises iron of a residual coercive field strength of about 5 Oe in order to dampen movement of the shaft of the cross-coil rotary magnet device.

* * * * *